(12) United States Patent
Fahr et al.

(10) Patent No.: US 10,247,901 B2
(45) Date of Patent: Apr. 2, 2019

(54) STIFFENED LENS MOUNT

(71) Applicant: JENOPTIK Optical Systems GmbH, Jena (DE)

(72) Inventors: Stephan Fahr, Jena (DE); Torsten Erbe, Jena (DE); Carolin Rosenberger, Jena (DE)

(73) Assignee: JENOPTIK OPTICAL SYSTEMS GMBH, Jena (DE)

( * ) Notice: Subject to any disclaimer, the term of this patent is extended or adjusted under 35 U.S.C. 154(b) by 311 days.

(21) Appl. No.: 15/271,613

(22) Filed: Sep. 21, 2016

(65) Prior Publication Data

US 2017/0082825 A1    Mar. 23, 2017

(30) Foreign Application Priority Data

Sep. 21, 2015  (DE) .................. 10 2015 115 930

(51) Int. Cl.
*G02B 7/02*      (2006.01)
(52) U.S. Cl.
CPC .................................. *G02B 7/026* (2013.01)

(58) Field of Classification Search
CPC ......... G02B 7/026; G02B 7/028; G02B 7/008
See application file for complete search history.

(56) References Cited

U.S. PATENT DOCUMENTS

| 6,560,045 | B1 | 5/2003 | Schletterer |
| 7,609,464 | B2 | 10/2009 | Rief et al. |
| 8,547,652 | B2 | 10/2013 | Bornschein |

FOREIGN PATENT DOCUMENTS

| DE | 10 2007 030 579 A1 | 1/2008 |
| DE | 10 2006 038 634 A1 | 2/2008 |
| DE | 10 2006 060 088 A1 | 6/2008 |
| DE | 10 2008 063 223 B3 | 9/2010 |
| EP | 1 094 348 B1 | 4/2005 |

*Primary Examiner* — Alicia M Harrington
(74) *Attorney, Agent, or Firm* — Duane Morris LLP

(57) ABSTRACT

A stiffened lens mount with an outer mount ring having an axis of symmetry, an inner mount ring arranged coaxial to the outer mount ring and connection structures. The inner mount ring has at least one end face arranged perpendicular to the axis of symmetry, and a coaxially arranged stiffening ring fixedly connected to the inner mount ring via the at least one end face along an imaginary circle.

8 Claims, 5 Drawing Sheets

A - A

B - B

C - C

STIFFENED LENS MOUNT

RELATED APPLICATIONS

The present application claims priority benefit of German Application No. DE 10 2015 115 930.9 filed on Sep. 21, 2015, the contents of which is incorporated by reference in its entirety.

FIELD OF THE INVENTION

Lens mounts are basically used for mechanically holding in a precise manner individual optical lenses or a plurality of lenses which are bonded to one another, also called cemented groups (hereinafter referred to only as lens), in exact mounted and/or adjusted positions within a lens system, i.e., with a determined spacing and orientation with respect to one another. Beyond this, it is important for lens systems with high requirements for imaging quality that the lenses are mounted so as to be stable with respect to environment and, as far as possible, so as to be deformation-free and stress-free and that the lens mount, including the mounted lens, has a high natural frequency.

There are diverse reasons for stresses occurring in a lens mount and, accordingly, for forces acting on the mounted lens.

BACKGROUND OF THE INVENTION

The actually operative reasons and the question of whether the effects can be tolerated or must be remedied depends on the conditions of use and the requirements for imaging quality of the mounted lens.

In many lens mounts known from the prior art, thermal stresses brought about by the different expansion coefficients of the material of the mount and of the optical element are to be compensated. The thermal stresses occurring between a mount ring and a lens or between an outer mount ring and an inner mount ring in which the lens is held are essentially caused by radially acting forces. To eliminate or minimize entry of forces into the lens, it is known to configure the joints, generally three joints, between the mount ring and lens, or outer mount ring and inner mount ring, such that they can compensate for the difference in expansion through deformation. For this purpose, the joints are configured to be radially soft as is known, e.g., from DE 10 2006 060 088 A1. The transmission of components of dynamic force, e.g., through a shock load, in a radial plane can also be reduced via joints which are configured to be radially soft. There are also downward limits with respect to the accompanying low mechanical flexural strength, particularly in the event of a commonly required high stiffness relative to axial forces. This is why, whatever the case, the reaction forces occurring through deformation act proportionately on the lens or possibly on the inner mount ring. It is also disadvantageous that, as the case may be, the inner mount ring and outer mount ring cannot be produced monolithically.

Also known in the art are lens mounts in which the mount ring in which the lens is held is specifically configured so that asymmetrically acting dynamic forces that have entered the mount ring via the outer circumference thereof, particularly force components acting in a radial plane or thermal forces acting radially in a rotationally asymmetrical manner, are absorbed and not transferred to the lens. To this end, in a lens mount known from EP 1 094 348 B1, elastic segments are formed at the inner circumferential surface, which elastic segments extend radially into an annular groove formed at the lens. This mount ring can be the inner mount ring of a lens mount so that the effects of the above-mentioned joints between an outer mount ring and an inner mount ring and the specific configuration of the inner mount ring can add up such that hardly any thermally induced reaction forces are transmitted to the lens.

A further reason for the occurrence of stresses in the lens mount may be the actuation of adjusting units by means of which, when a lens mount is divided into an inner mount ring and an outer mount ring, the inner mount ring in which the lens is held is adjusted within a radial plane relative to the outer mount ring. In this case, asymmetrically acting radial forces (hereinafter radial forces), or at least forces acting one-sidedly in a radial plane, are deliberately introduced into the inner mount ring to cause an at least approximately translational movement.

There are solutions in which the lens mount is radially stiff in the operative direction of the adjusting units along which a translational movement is introduced in each instance into the inner mount ring. This is the case when the adjusting units act directly on the inner mount ring or on a web which is oriented with the latter in radial direction as component part of one of the joints between outer mount ring and inner mount ring. An example of this is disclosed in DE 10 2008 063 223 B3.

Instead of this, the lens mount can also be radially soft in the operative direction of the adjusting units along which a translational movement is introduced in each instance into the inner mount ring in that the adjusting units act at correspondingly radially soft joints such that an introduced adjusting path is transmitted to the inner mount ring in a stepped down and, therefore, more sensitive manner. An example of this is given in DE 10 2007 030 579 A1.

In both cases of adjustable lens mounts, the adjusting forces, or portions of these adjusting forces, which act on the inner mount ring are introduced into the inner mount rings depending on the reaction forces in abutments formed by the further adjusting units or joints.

In all of the cases mentioned above, radial forces introduced into the inner mount rings, regardless of whether they are adjusting forces or reaction forces, can lead to deformation of the inner mount ring and, therefore, to a substantial deformation of the lens. Even a deformation in the range of a few nanometers represents a substantial deformation when it leads to intolerable impairments in imaging quality.

In terms of construction, the simplest way to at least reduce a deformation of the lens is by constructing the lens mount to be so sturdy in radial direction that no deformation could result that would be transmitted to the lens as a substantial deformation. However, this conflicts with the demand for a small installation space, an economical use of material, lightweight construction and a high natural frequency of the mounted lens.

In a monolithic optical mount according to DE 10 2008 063 223 B3, cited above, it may be assumed that the inner mount ring is constructed to be sufficiently thick radially so that the inner circumferential surface with which the mounted lens communicates is not substantially deformed. Considered strictly geometrically, the thickness could be reduced to a measure only slightly greater than the length of the radial web (referred to as foot piece in the cited publication) so that, apart from material, installation space could also be saved in radial direction.

DE 10 2006 038 634 A1 discloses a holding device for an optical element having an outer mount ring (referred to therein as base element) and a plurality of contact elements arranged so as to be distributed over the circumference of the base element and so as to be movable in radial direction. The contact elements are connected to one another in circumferential direction of the base element via at least one connection device such that the radial forces acting on the contact elements are coupled to one another. In this way, fluctuations and differences between the contact forces acting on the optical element at the contact elements are equalized. The contact elements can advantageously be connected, after installing the lens in the lens mount, via a stiffening ring which is supposed to counteract peeling stresses of the adhesive bond between the lens and the contact elements.

SUMMARY OF THE INVENTION

It is the object of the invention to provide a lens mount with an outer mount ring and an inner mount ring in which radial forces acting on the inner mount ring from the outside do not lead to a deformation of an inner circumferential surface of the inner mount ring.

For a lens mount with an outer mount ring, an inner mount ring which is arranged coaxial to the outer mount ring and which has at least one end face arranged perpendicular to the axis of symmetry, and with connection structures via which the inner mount ring is connected to the outer mount ring, the above-stated object is met in that at least one stiffening ring is arranged coaxial to the inner mount ring, and the at least one stiffening ring is fixedly connected to the inner mount ring via the at least one end face along an imaginary circle.

The at least one end face advantageously has a radial extension which is only large enough to be sufficient for a connection to the at least one stiffening ring so that the at least one stiffening ring only contacts the inner mount ring via the connection.

A stiffening of the inner mount ring can be improved still further in that the lens mount has exactly two stiffening rings.

It is advantageous when the imaginary circles along which the stiffening rings are connected to the inner mount ring in each instance have an identical radius.

The stiffening ring, or stiffening rings, of a lens mount can be constructed in each instance as an individual ring or can be formed by a ring stack, i.e., a plurality of individual rings or material layers which are stacked one upon the other.

It is advantageous when the possibly two stiffening rings are dimensioned and arranged in such a way that they make the same contribution on opposing sides to the area moment of inertia of the inner mount ring.

BRIEF DESCRIPTION OF THE DRAWINGS

The invention will be described more fully in the following with reference to embodiment examples and drawings. The drawings show:

FIG. 1b is a top view of a lens mount according to FIG. 1a;

FIG. 2b is a top view of a lens mount according to FIG. 2a;

FIG. 3b is a top view of a lens mount according to FIG. 3a;

DETAILED DESCRIPTION OF THE DRAWINGS

Figure 1A:
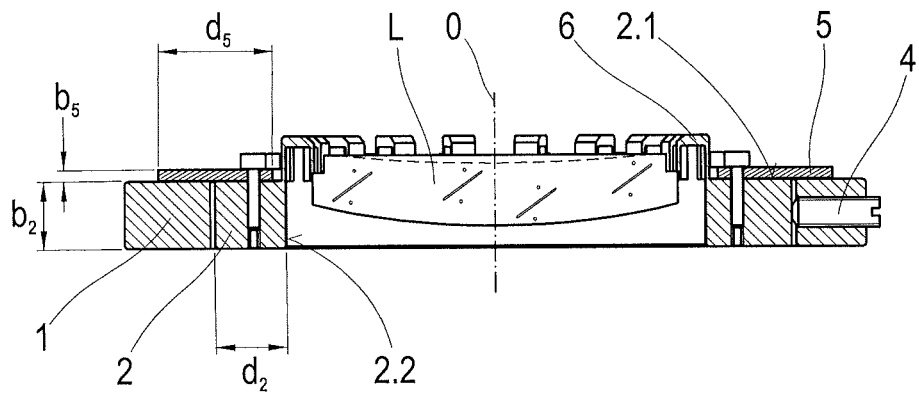
FIG. 1a is a sectional view of a first construction of a lens mount.

A lens mount according to the invention is formed substantially by an outer mount ring 1, an inner mount ring 2, at least one stiffening ring 5 and at least two connection structures 3 between the outer mount ring 1 and inner mount ring 2. The outer mount ring 1, the inner mount ring 2 and the at least one stiffening ring 5 are arranged coaxial to one another on an axis of symmetry 0. A lens L can be installed in the inner mount ring 2.

In addition to the connection structures 3, the lens mount can have adjusting units 4 which are supported in the outer mount ring 1 and contact the inner mount ring 2 directly or indirectly via the connection structures 3.

The lens mount is advantageously formed by an annular body which is divided through material recesses into the outer mount ring 1, the inner mount ring 2 and the at least two connection structures 3.

It is key to the invention that the thickness of the inner mount ring 2 determined by the difference between the inner radius of an inner circumferential surface 2.2 and the outer radius of an outer circumferential surface can be selected irrespective of the demands for the flexural strength of the inner mount ring 2, particularly relative to radial load. In the event that the outer circumferential surface does not correspond to a cylindrical lateral surface, the outer radius refers to an inner circle which is as large as possible. For example, if the circumferential surface is an octagonal, prismatic circumferential surface, the eight lateral surfaces forming the prismatic circumferential surface contact this largest possible inner circle tangentially.

This option of selecting a thickness $d_2$ of the inner mount ring 2 independent from the demands for its flexural strength according to other technological or structural viewpoints results from the assembly of the one or two stiffening rings 5 with the inner mount ring 2.

The one or two stiffening rings 5 are fixedly connected to the inner mount ring 2 along an imaginary circle K around the axis of symmetry 0 in each instance via an end face, possibly via two opposite end faces 2.1 arranged perpendicular to the axis of symmetry 0.

The following remarks about the stiffening ring 5 refer, where applicable, to both stiffening rings 5. The stiffening rings 5 of a lens mount need not be constructed identically.

The connection between the inner mount ring 2 and the stiffening ring 5 is preferably a detachable connection which is in turn preferably produced by a plurality of screws. For a detachable connection, a glue joint or solder joint in particular may be considered.

The stiffening ring 5 is constructed so as to be as thick as possible in order for the stiffening ring 5 to have the greatest possible radial flexural strength. Depending on the geometric construction and dimensioning of the inner mount ring 2 and outer mount ring 1, the stiffening ring 5 covers the inner mount ring 2 and/or outer mount ring 1 partially or completely to achieve a large radial extension (thickness $d_5$ of the stiffening ring 5) in an advantageous manner. It stiffens the inner mount ring 2 along the circle K so that the inner mount ring 2 cannot be deformed within this circle K.

In a lens mount with two stiffening rings 5, the respective circles K can advantageously have an identical radius, but need not have an identical radius. Because of the radial stiffening of the inner mount ring 2 along the circle K, when radial forces act along the outer circumferential surface of the inner mount ring 2 the forces are not transmitted to the inner circumferential surface 2.2 but rather are absorbed by the stiffening ring 5.

The stiffening ring 5 is advantageously arranged and constructed in such a way that it has the greatest possible stiffness in the radial direction so that deformations of the inner mount ring 2 are prevented within the circle K. In its width $b_5$, i.e., in its axial direction, the stiffening ring 5 is constructed as narrowly as possible. It is possible that the stiffening ring 5 extends beyond the circumferential surface of a lens L mounted in the inner mount ring 2 provided the beam path is not limited in this way.

If a sufficiently large radial extension and, therefore, stiffness is not possible through the stiffening ring 5 due to spatial limitations, a wider stiffening ring 5 is used. A thicker stiffening ring 5 can advantageously be formed by a ring stack. This results in a spring connection which is comparatively stiff in the radial direction but softer in other directions compared to a monolithic stiffening ring 5 of the same thickness.

Depending on the geometric construction of the inner mount ring 2, the lens mount has a stiffening ring 5 or, advantageously, two stiffening rings 5. They are connected in each instance to end faces 2.1 formed at the inner mount ring 2. Advantageously, the possibly two stiffening rings 5 are dimensioned and arranged in such a way that they make the same contribution on opposing sides to the area moment of inertia of the inner mount ring 2.

Advantageously, the material used for the stiffening ring 5 is the same material as that used for the annular body or another material with an at least similar coefficient of thermal expansion. Ideally, it has a high coefficient of thermal conductivity.

In principle, the use according to the invention of one or two stiffening rings 5 is possible in combination with all of the generic lens mounts shown in the prior art. It is advantageous particularly in combination with adjustable lens mounts in which a radial force input into the inner mount ring 2 is required asymmetrically for purposes of adjusting the inner mount ring 2.

A selection of different constructions of lens mounts whose features can also be combined with one another is shown in the drawings.

Figure 1B:
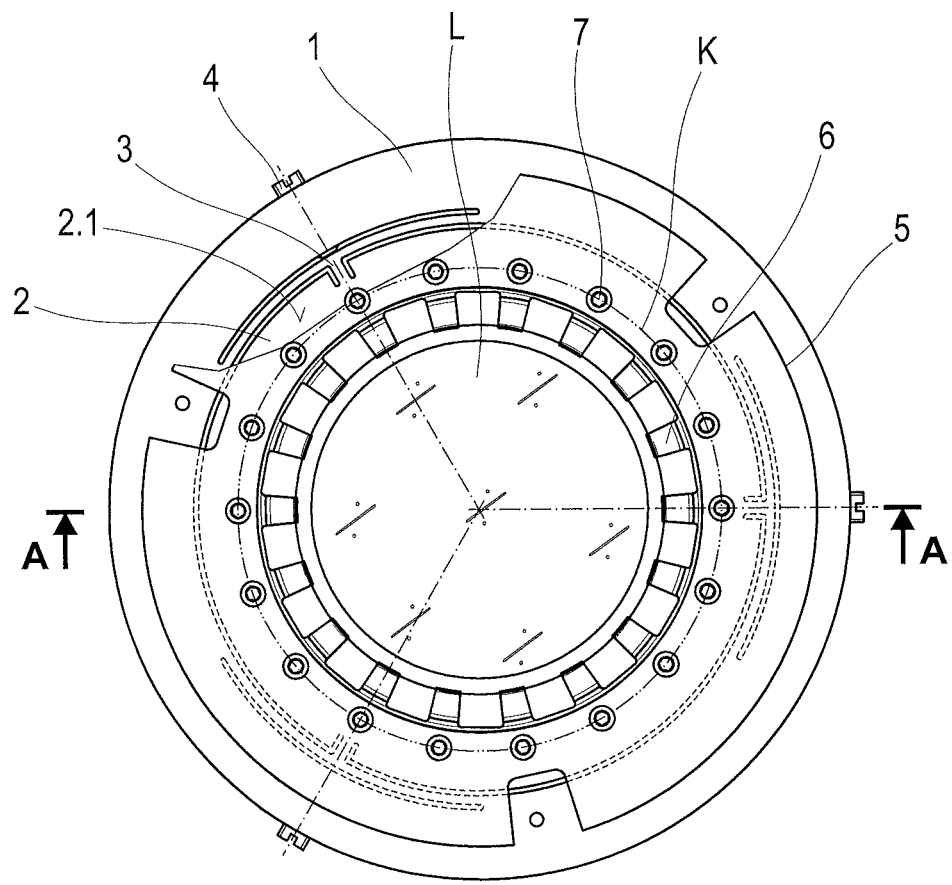

FIGS. 1a and 1b show a lens mount in which the inner mount ring 2 is constructed in accordance with the teaching of EP 1 094 348 B1, cited above, so that stresses through symmetrically acting thermal forces between the lens L and lens mount are additionally compensated through the deflection of segments 6. The thickness $d_2$ of the inner mount ring 2 between the segments 6 and the outer circumferential surface thereof is dimensioned such that it offers sufficient room for screw connections 7 along the circle K.

The stiffening ring 5 extends inward from the circle K until close to the segments 6 and outward partially over an end face of the outer mount ring 1 via which the lens mount can be connected to other lens mounts or can contact a collar in a tube.

Figure 2A:
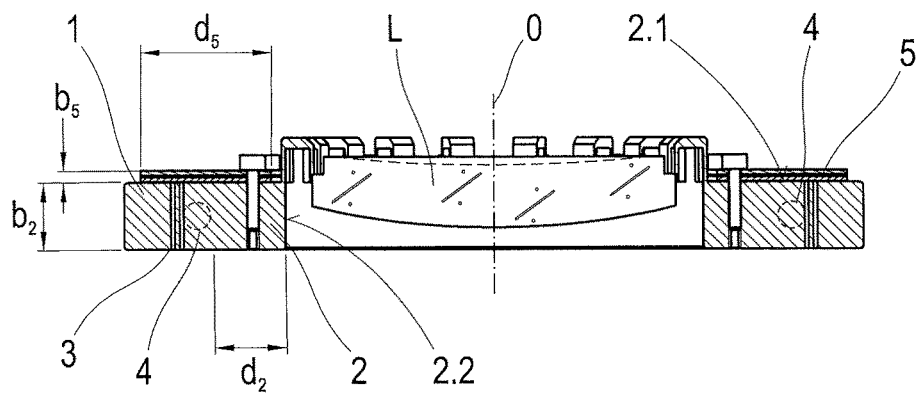
FIG. 2a is a sectional view of a second construction of a lens mount.
Figure 2B:
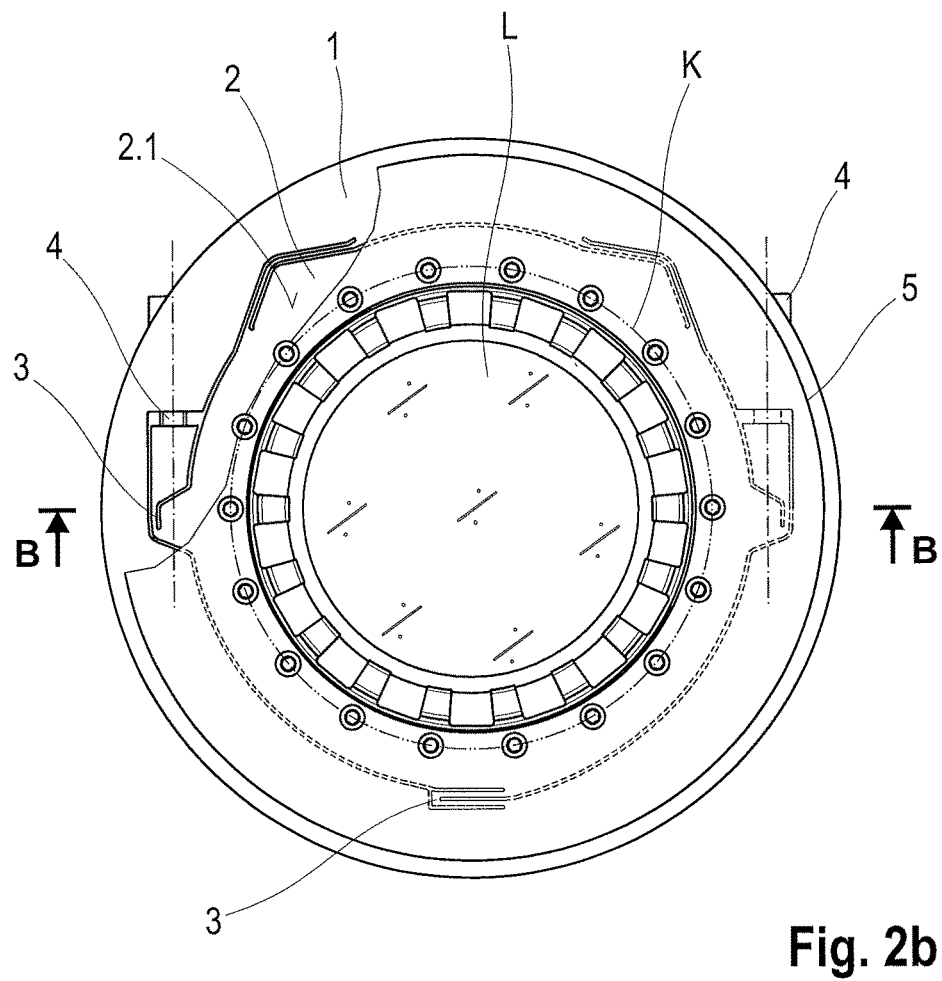

FIGS. 2a and 2b show a lens mount in which the connection structures 3 which connect the outer mount ring 1 and the inner mount ring 2 together monolithically are constructed such that, compared to the lens mount according to the first embodiment example, an introduced adjusting movement is transmitted with a different transmission ratio. The outer circumferential surface of the inner mount ring 2 is mainly determined by the geometry of the connection structures 3 in this case. In contrast to the first embodiment example, the stiffening ring 5 in this case is not formed by an individual ring but by a ring stack.

Figure 3A:
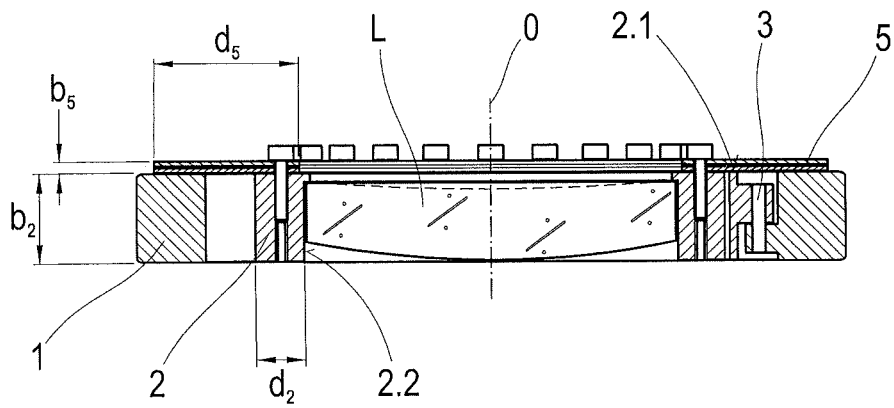
FIG. 3a is a sectional view of a third construction of a lens mount.
Figure 3B:
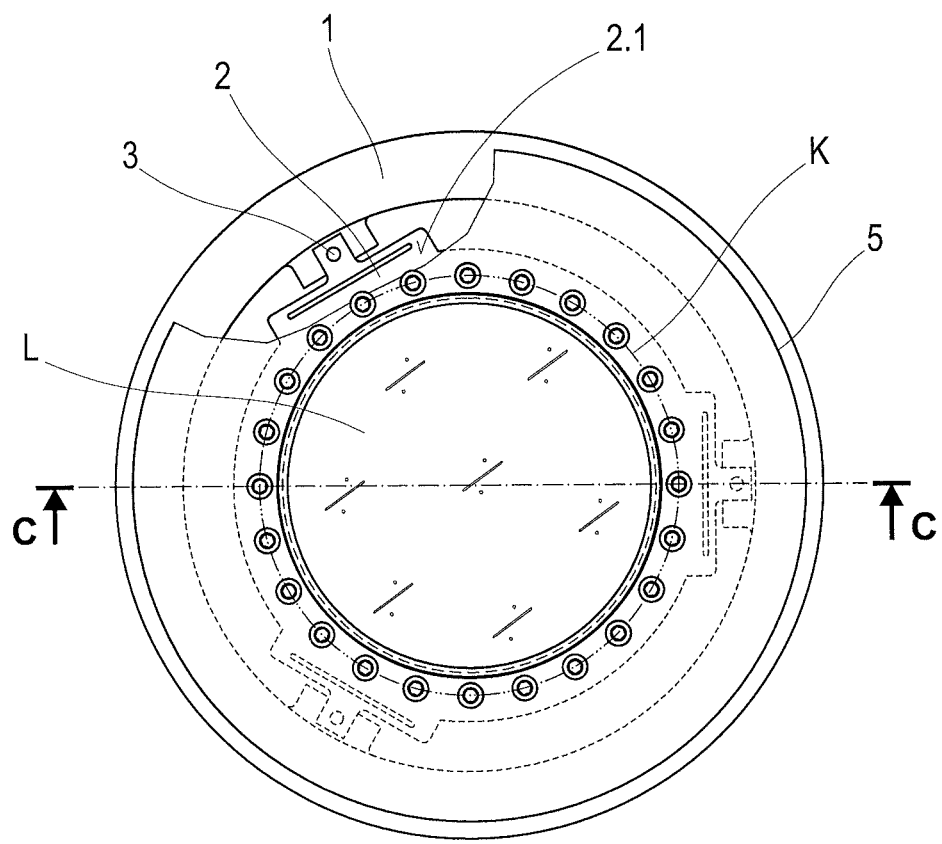

In the third embodiment example shown in FIGS. 3a and 3b, the outer mount ring 1 and the inner mount ring 2 are discretely connected via connection structures 3 which are realized in this instance by means of a pin.

Figure 4:
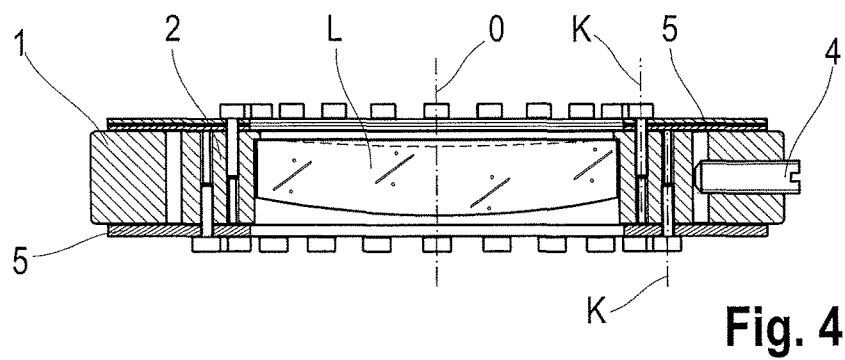
FIG. 4 is a sectional view of a fourth construction of a lens mount.
Figure 7:
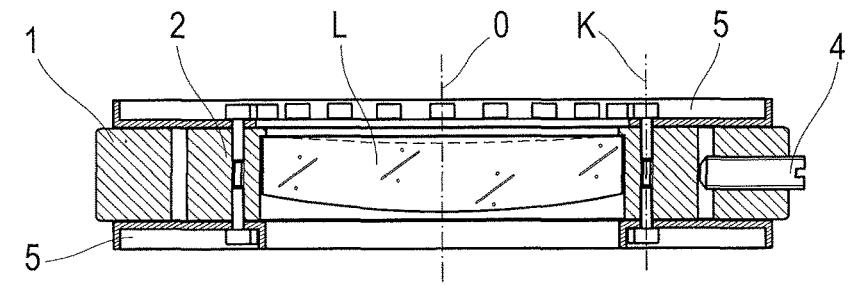
FIG. 7 is a sectional view of a seventh construction of a lens mount.

The fourth embodiment example shown in FIG. 4 differs from those mentioned above in that the lens mount has two stiffening rings 5. The imaginary circles K along which the stiffening rings 5 are connected to the inner mount ring 2 in each instance on opposite end faces via screw connections 7 have a different radius so that the screw-in length for the screw connections 7 is limited by the width $b_2$ of the inner mount ring 2. For a broader inner mount ring 2, particularly when it is constructed symmetrical to a radial plane through the center of gravity of the inner mount ring 2, it is advantageous when the circles K have an identical radius. The screws for fastening the two stiffening rings 5 are then screwed into identical boreholes in opposite directions as is shown in FIG. 7.

Figure 5:
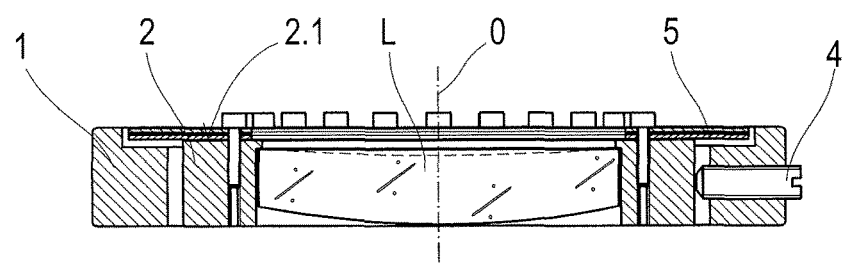
FIG. 5 is a sectional view of a fifth construction of a lens mount.

In the fifth embodiment example, shown in FIG. 5, the inner mount ring 2 is constructed so as to be wider, at least in the area in which the stiffening ring 5 makes contact, than the outer mount ring 1 at least in the areas in which the stiffening ring 5 overlaps the outer mount ring 1 so that no friction can arise between the stiffening ring 5 and outer mount ring 1 when the adjusting units 4 are actuated.

Figure 6:
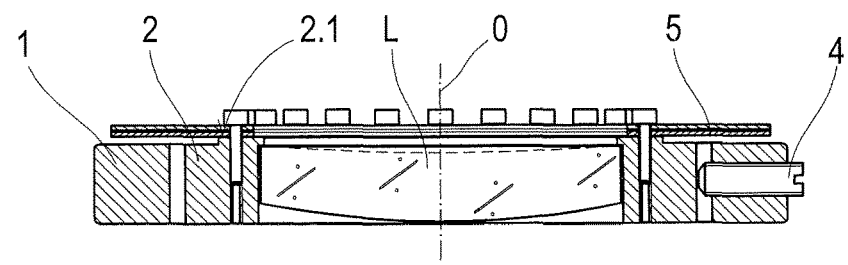
FIG. 6 is a sectional view of a sixth construction of a lens mount.

With the same aim, the inner mount ring 2 in the sixth embodiment example, shown in FIG. 6, is stepped. The upper step formed in this way which limits the end face 2.1 is only so narrow as to still offer a sufficient mechanical stability around the bore holes arranged along the circle K for receiving screws for the screw connections 7 by which the stiffening ring 5 is connected to the inner mount ring 2. This means that the end face 2.1 via which the inner mount ring 2 makes contact with the stiffening ring 5 is only so large as to be sufficient for the connection to the stiffening ring 5 so that the stiffening ring 5 contacts the annular body exclusively via the connection. Additionally, the surface area at the inner mount ring 2 on which friction can arise as a result of the manipulator movements between the inner mount ring 2 and the stiffening ring 5 is minimized in this way.

As was explained referring to FIGS. 5 and 6, the constructions of the inner mount ring 2 and the outer mount ring 1 are transferable to embodiment examples with two stiffening rings 5.

In a seventh embodiment example, shown in FIG. 7, the stiffening rings 5 are angled along their outer circumferential surface or along their outer and inner circumferential surfaces, so that they achieve a greater stiffness.

Figure 8:
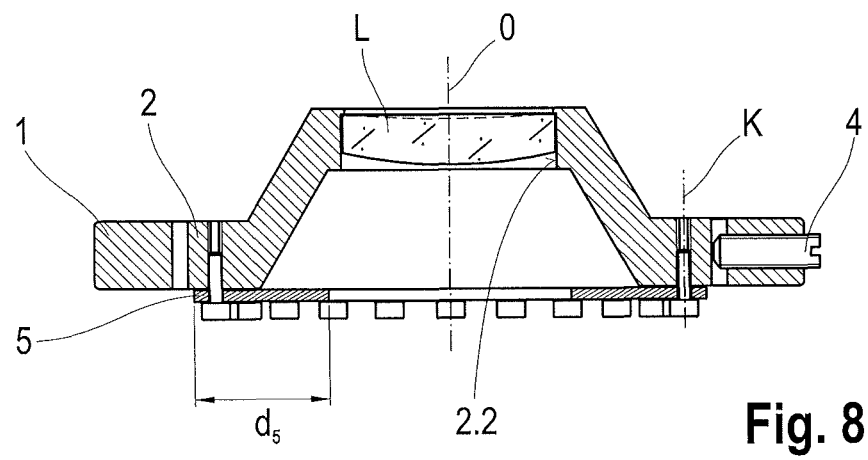
FIG. 8 is a sectional view of an eighth construction of a lens mount.
Figure 9:
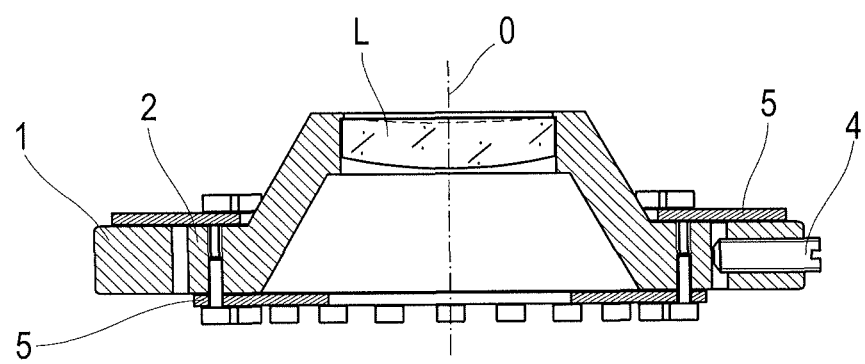
FIG. 9 is a sectional view of a ninth construction of a lens mount.
Figure 10:
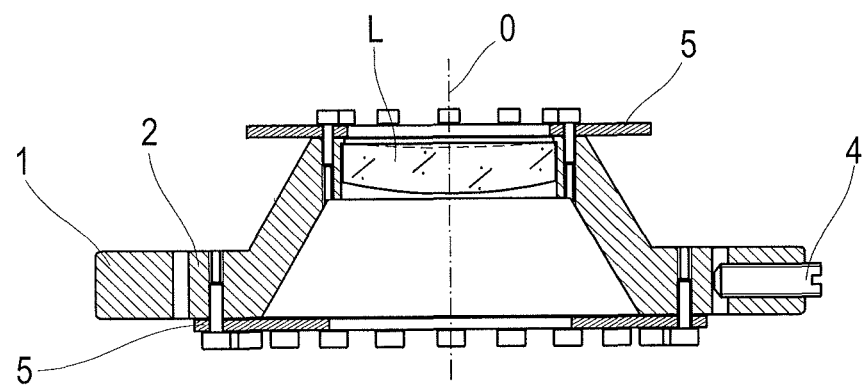
FIG. 10 is a sectional view of a tenth construction of a lens mount.

FIGS. 8, 9 and 10 show an eighth, ninth and tenth embodiment example which exhibit a third geometric construction of the inner mount ring 2 compared to the first three embodiment examples. While the center of gravity of the lens L and the center of gravity of the inner mount ring 2 in the first three embodiment examples are located at least in proximity to one another, they are located at an appreciable distance from one another in this case so that a greater distance can be realized between the mounted lenses L through the connection of two such lens mounts. As a result of the conical geometry of the inner mount ring 2, the difference between the radius of the inner circumferential surface 2.2 via which the lens L is held and the radius of circle K is comparatively large. This difference is advantageously utilized as the thickness $d_5$ of the stiffening ring 5.

The ninth and tenth embodiment examples shown in FIGS. 9 and 10 differ from the eighth embodiment example through a second stiffening ring 5 which is arranged in each instance opposite the first stiffening ring 5.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE CHARACTERS

0 axis of symmetry
1 outer mount ring
2 inner mount ring
2.1 end face
2.2 inner circumferential surface
3 connection structure
4 adjusting unit
5 stiffening ring
6 segment
7 screw connection
K circle
L lens
$d_2$ thickness (of the inner mount ring 2)
$d_5$ thickness (of the stiffening ring 5)
$b_2$ width (of the inner mount ring 2)
$b_5$ width (of the stiffening ring 5)

What is claimed is:

1. A stiffened lens mount comprising: an outer mount ring having an axis of symmetry; an inner mount ring which is arranged coaxial to the outer mount ring and has one or two end faces arranged perpendicular to the axis of symmetry; and connection structures via which the inner mount ring is connected to the outer mount ring; one or two stiffening rings being arranged coaxial to the inner mount ring; said one or two stiffening rings being fixedly connected to the inner mount ring in each instance; via one of the respective end faces along an imaginary circle in each instance, at least one of the stiffening rings extending beyond a circumferential surface of a lens mounted in the inner mount ring at least partially overlapping the outer mount ring; and the one or two stiffening rings with their thickness having a greater radial dimension than the inner mount ring with its thickness.

2. The stiffened lens mount according to claim 1, wherein the one or two end faces have a radial dimension which is only large enough in each instance to be sufficient for a connection to the one or two stiffening rings so that the one or two stiffening rings only contact the inner mount ring in each instance via the connection.

3. The stiffened lens mount according to claim 2, wherein the one or two stiffening rings are formed in each instance by an individual ring or a ring stack.

4. The stiffened lens mount according to claim 1, wherein the lens mount has exactly two stiffening rings, and the imaginary circles along which the two stiffening rings are connected to the inner mount ring in each instance have an identical radius.

5. The stiffened lens mount according to claim 4, wherein the one or two stiffening rings are formed in each instance by an individual ring or a ring stack.

6. The stiffened lens mount according to claim 4, wherein the two stiffening rings are dimensioned and arranged in such a way that they make the same contribution an opposing sides to the area moment of inertia of the inner mount ring.

7. The stiffened lens mount according to claim 1, wherein the one or two stiffening rings are formed in each instance by an individual ring or a ring stack.

8. The stiffened lens mount according to claim 7, wherein the two stiffening rings are dimensioned and arranged in such a way that they make the same contribution an opposing sides to the area moment of inertia of the inner mount ring.

* * * * *